US007518853B2

United States Patent
Kato et al.

(12) United States Patent
(10) Patent No.: US 7,518,853 B2
(45) Date of Patent: Apr. 14, 2009

(54) ELECTRIC POWER DISTRIBUTION DEVICE

(75) Inventors: Hajime Kato, Shizuoka (JP); Hidehiko Kuboshima, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 105 days.

(21) Appl. No.: 11/542,635

(22) Filed: Oct. 4, 2006

(65) Prior Publication Data
US 2007/0076354 A1 Apr. 5, 2007

(30) Foreign Application Priority Data
Oct. 5, 2005 (JP) ............................. 2005-292122

(51) Int. Cl.
*H02B 1/20* (2006.01)
*H02K 11/00* (2006.01)
(52) U.S. Cl. .................... 361/637; 310/71; 310/68 R
(58) Field of Classification Search .................. None
See application file for complete search history.

(56) References Cited

U.S. PATENT DOCUMENTS 7,091,645 B2 * 8/2006 Yoneda et al. ............. 310/208
7,193,345 B2 * 3/2007 Shinzaki et al. ............. 310/71
2006/0138883 A1 * 6/2006 Yagai et al. .................. 310/71
2007/0004249 A1 * 1/2007 Uchiyama et al. ......... 439/76.2

FOREIGN PATENT DOCUMENTS

| JP | 2003-134724 | | 5/2003 |
| JP | 2003134724 A | * | 5/2003 |
| JP | 2007135339 A | * | 11/2005 |
| JP | 2007259642 A | * | 3/2006 |
| JP | 2006204029 A | * | 8/2006 |

* cited by examiner

*Primary Examiner*—Boris L Chervinsky
(74) *Attorney, Agent, or Firm*—Kratz, Quintos & Hanson, LLP (57) ABSTRACT

A band-shaped bus bar includes a flat part disposed at the center thereof, and a curved part at both ends in a length direction. A receiving groove for receiving the bus bar is extended along a circle in an insulating holder. The flat part of the bus bar is received in the receiving groove in a curved manner.

7 Claims, 14 Drawing Sheets

ELECTRIC POWER DISTRIBUTION DEVICE

CROSS REFERENCE TO RELATED APPLICATIONS

This application is based on Japanese Patent Application No. 2005-292122, the contents of which are hereby incorporated by reference.

BACKGROUND OF THE INVENTION

1. Field of the Invention

The present invention relates to an electric power distribution device, in particular, to an electric power distribution device for supplying electric power to a stator coil that arranges on a motor-rotation axis centered circle.

2. Description of the Related Art

Recently, needs for reducing the fuel cost of a vehicle has become large, and for example, a development of the super-low fuel consumption hybrid vehicle is under development. Especially recently, a hybrid car with a motor assistance mechanism which assists an engine by a brushless DC motor when gathering speed is proposed.

The motor for use in the motor assistance mechanism includes a rotor directly coupled to a crankshaft of an engine, and a ring-shaped stator surrounding the rotor. The stator is composed by a lot of magnetic poles formed by coil a core, a stator holder for receiving the magnetic pole, and a concentrated electric power distribution device for supplying electricity to the coil intensively.

Figure 13:
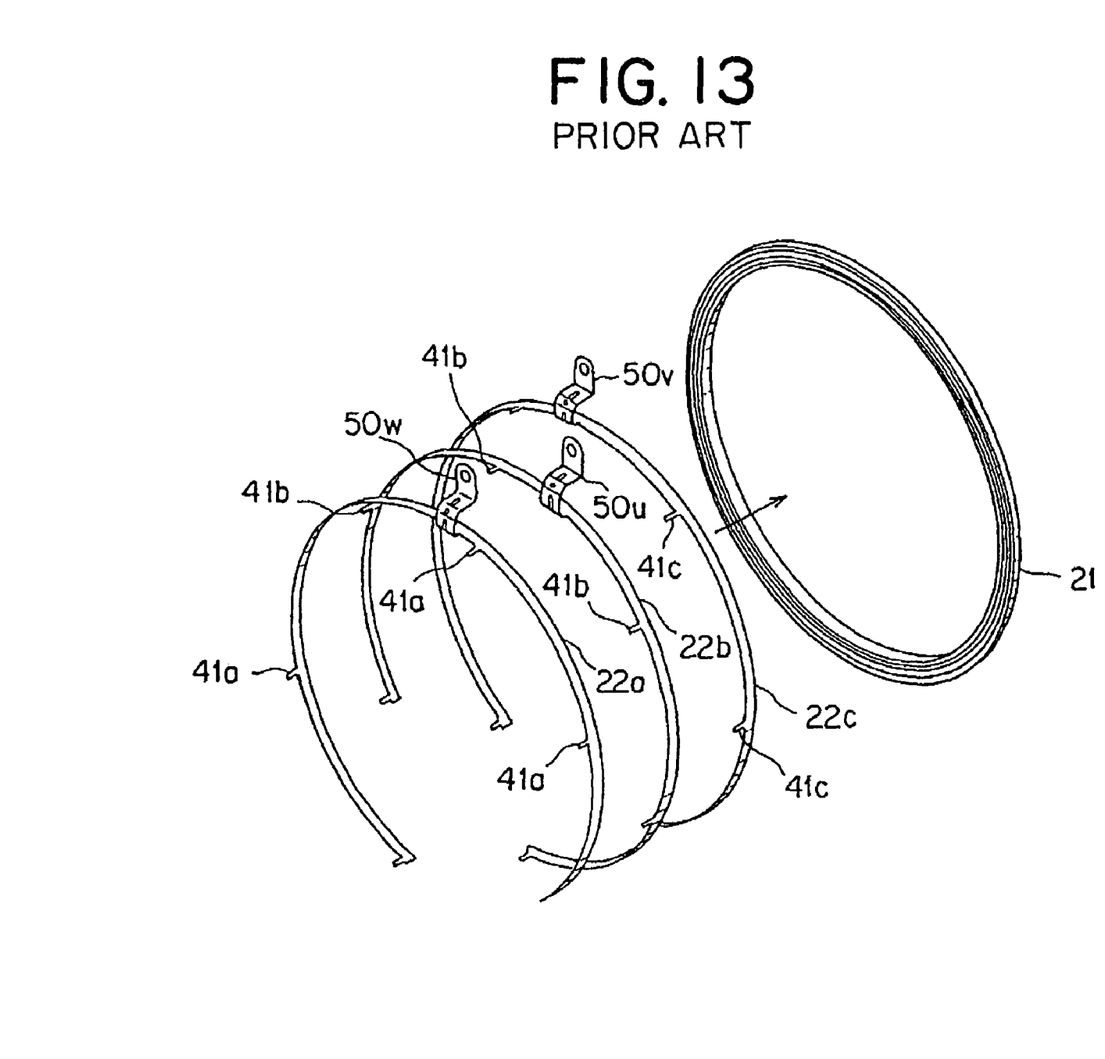
FIG. 13 is an exploded perspective view showing a conventional electric power distribution device.

FIG. 13 shows a conventional concentrated electric power distribution device disclosed in Japanese published patent application No. 2003-134724. As shown in FIG. 13, the concentrated electric power distribution device includes three bus bars 22a, 22b, 22c corresponding to each layers of a motor, and an insulating holder 21 receiving the bus bars 22a, 22b, 22c in a manner the bus bars are insulated to each other.

Figure 14:
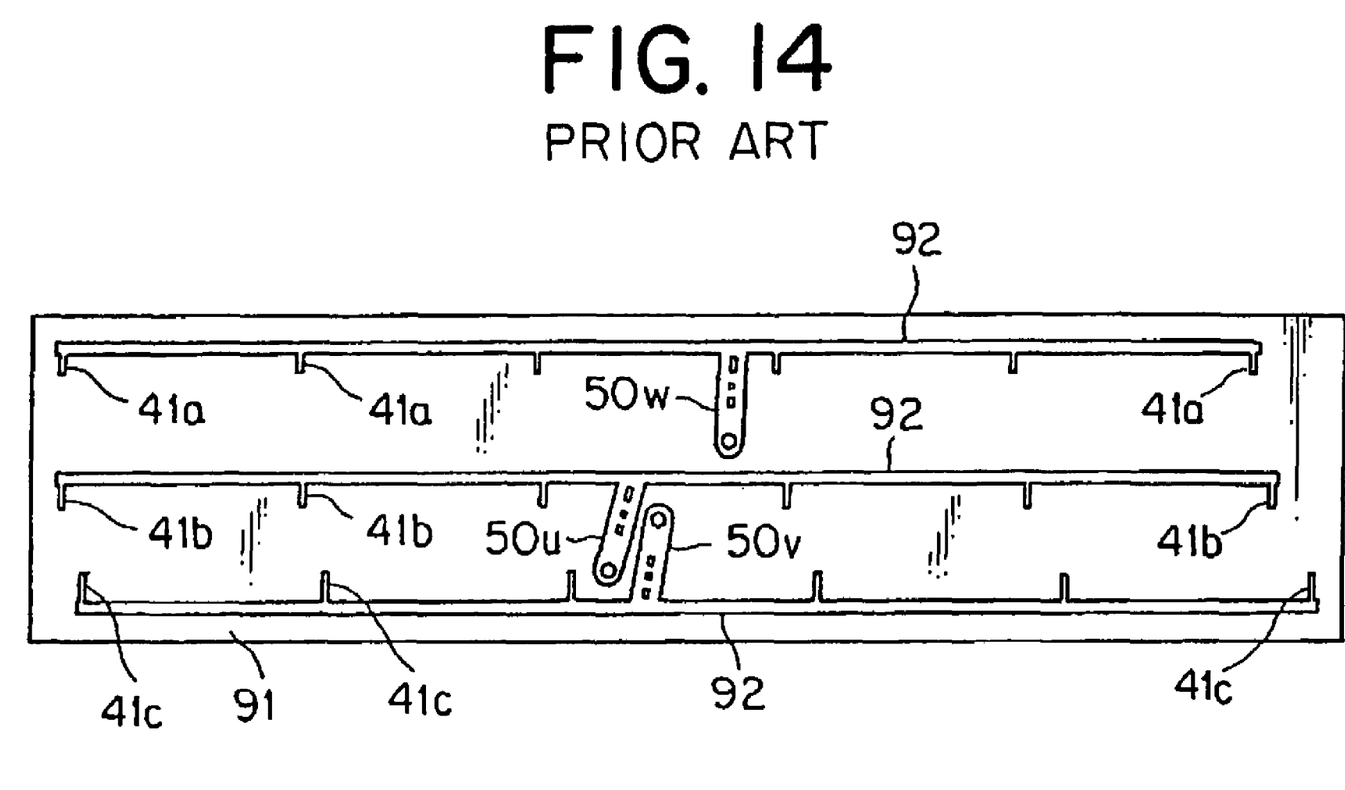
FIG. 14 is a front view showing a metal plate 91 having band-shaped bus bars 41a to 41c to be stamped.

As shown in FIG. 14, the bus bars 22a, 22b, 22c are formed by stamping a conductive metal plate 91 in a band shape, and bending the metal plate in a thickness direction thereof to form a substantially circular shape, where diameters of the bus bars are different from each other. Terminals 50v, 50u, 50w connected to a battery and tabs 41a, 41b, 41c connected to the coils of the stator are formed in a width direction at a far side from the insulating holder 21. Circular receiving grooves having the same radiuses as the bus bars 22a, 22b, 22c are formed on the insulating holder 21.

However, according to such a conventional concentrated power supply member, the bus bars 22a, 22b, 22c are curved in a length direction. Therefore, after stamping the metal plate, a bending machine bends the bars in whole lengths. Further, when curving the bus bars 22a, 22b, 22c by a press metal mold, it is necessary to divide the length direction into the plural for pressing. Therefore, a processing man-hour increases and it becomes a problem about the cost. Further, because the curving radiuses of the bus bars 22a, 22b, 22c are different, the bus bars 22a, 22b, 22c cannot be curved once. Further, two or more set of the bus bars 22a, 22b, 22c cannot arranged in a width direction of the metal plate 91. Therefore, the manpower and the production cost increases.

It is necessary to raise the processing accuracy when curving the bus bars 22a, 22b, 22c. If the curving radiuses of the bus bars 22a, 22b, 22c are different from those of the receiving grooves of the insulating holder 21, it is hard to receive the bus bars 22a, 22b, 22c in the receiving grooves of the insulating holder 21, and working ability decreases.

Accordingly, an object of the present invention is to provide an electric power distribution device with which the manpower of producing the bus bars can be reduced, and producing the bus bars at low cost.

SUMMERY OF THE INVENTION

In order to attain the object, according to the present invention, there is provided an electric power distribution device including:

a band-shaped bus bar having coil terminals disposed at an end of a width of the bus bar for supplying power to stator coils arranged on a circle a center of which is a motor rotation shaft; and a band-shaped bus bar holder on which a receiving groove for receiving the band-shaped bus bar is formed in a manner that the coil terminals are arranged on the circle, wherein each band-shaped bus bar at least partially has a flat part.

Preferably, the band-shaped bus bar at least partially includes a curved part curving along a circle a center of which is the motor rotation shaft.

Preferably, a plurality of the flat parts is formed on the band-shaped bus bar, and a folded part is formed between the flat parts adjacent to each other.

Preferably, the band-shaped bus bar includes a projection projecting from the other end of the width of the bus bar.

Preferably, the receiving grooves are extended along the circle the center of which is the motor rotation shaft in a view from an opening side of the receiving groove.

Preferably, the receiving grooves are extended along a polygon in a view from the opening side of the receiving groove.

Preferably, the bus bar holder formed by melting a part thereof includes a bus bar dropout prevention part for closing a part of the receiving groove opening.

These and other objects, features, and advantages of the present invention will become more apparent upon reading of the following detailed description along with the accompanied drawings.

DETAILED DESCRIPTION OF THE PREFERRED EMBODIMENTS

First Embodiment

A first embodiment of an electric power distribution device according to the present invention will be described with reference to Figures.

A brushless motor (not shown) generally includes a rotor connected directly with a motor rotation shaft, and a ring-shaped stator surrounding the rotor. Three-phase stator coils are wound around cores of the stator. The stator coils are arranged on a circle about the motor rotation shaft. In this embodiment, for example, twelve stator coils are wound around cores, and arranged at equal intervals on the circle about the motor rotation shaft. The electric power distribution device of the present invention is used for supplying electric power by connecting the stator coils L as shown in FIG. 8.

Figure 1:
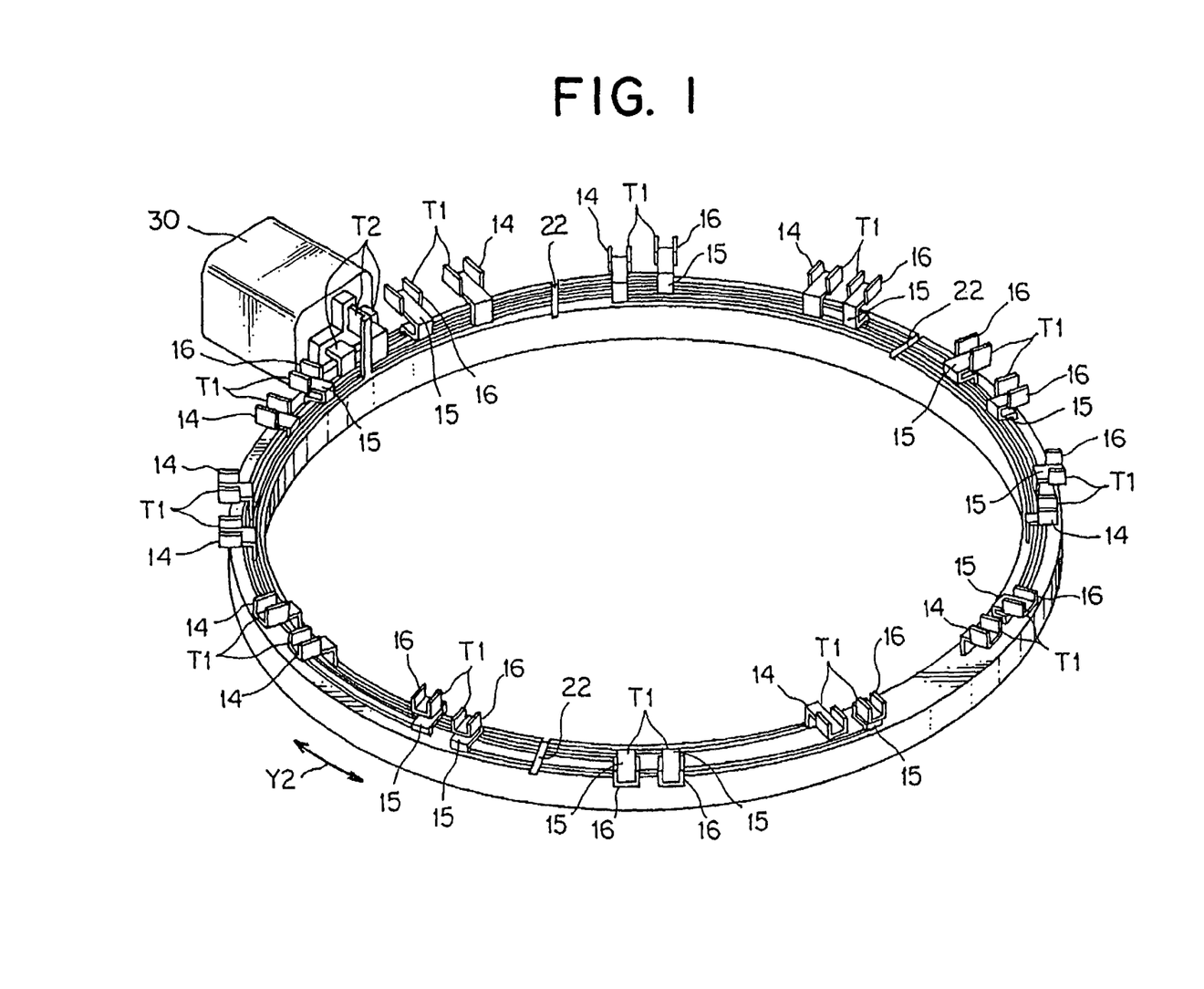
FIG. 1 is a perspective view showing a first embodiment of an electric power distribution device according to the present invention.
Figure 2:
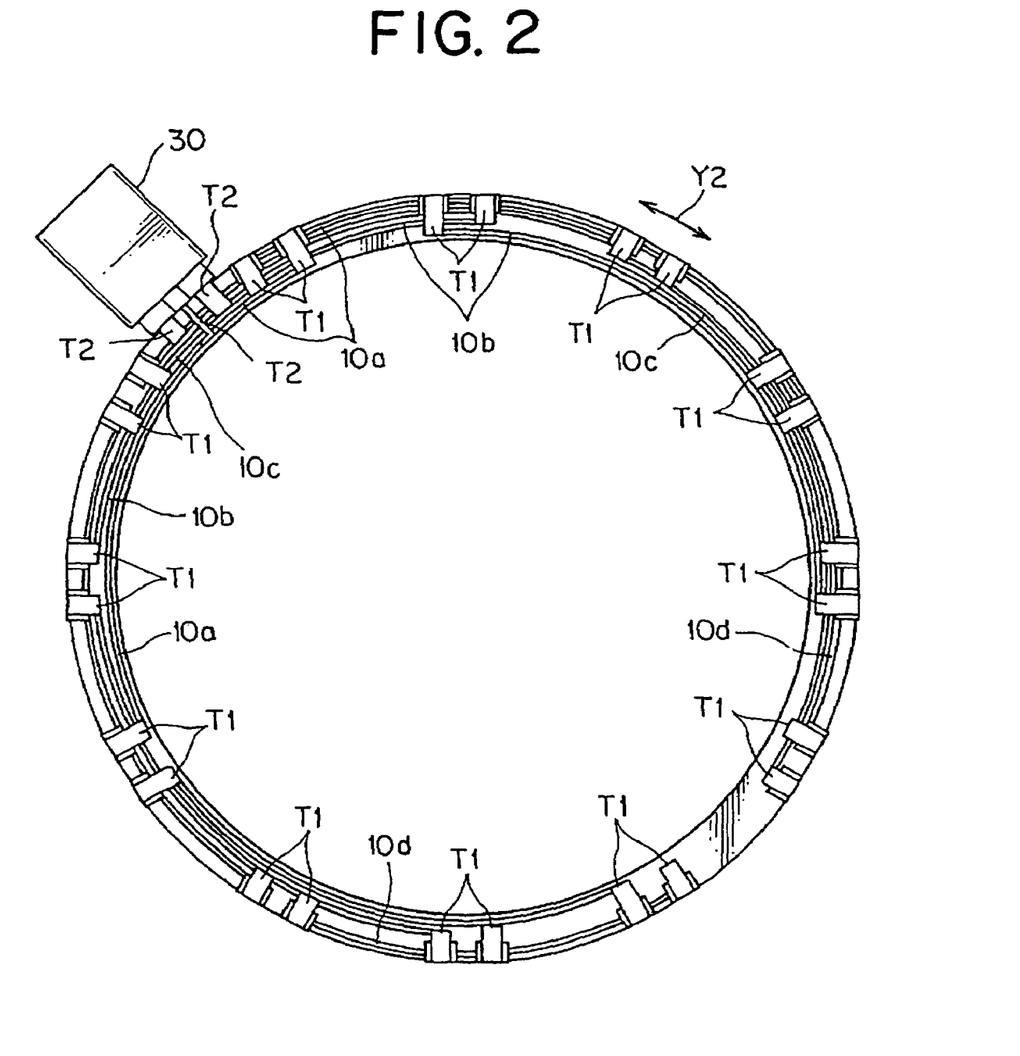
FIG. 2 is a front view of the electric power distribution device of FIG. 1.

As shown in FIGS. 1 and 2, the electric power distribution device includes a plurality of band-shaped bus bars 10a to 10d (shown in FIG. 2), on which end coil terminals T1 are formed in a width direction Y1 for supplying electric power to the stator coil L, and an insulating holder 20 (bus bar holder) on which receiving grooves 21a to 21d (shown in FIG. 5) are formed for receiving the band-shaped bus bars 10a to 10d in a manner the bus bars are insulated to each other.

Figure 8:
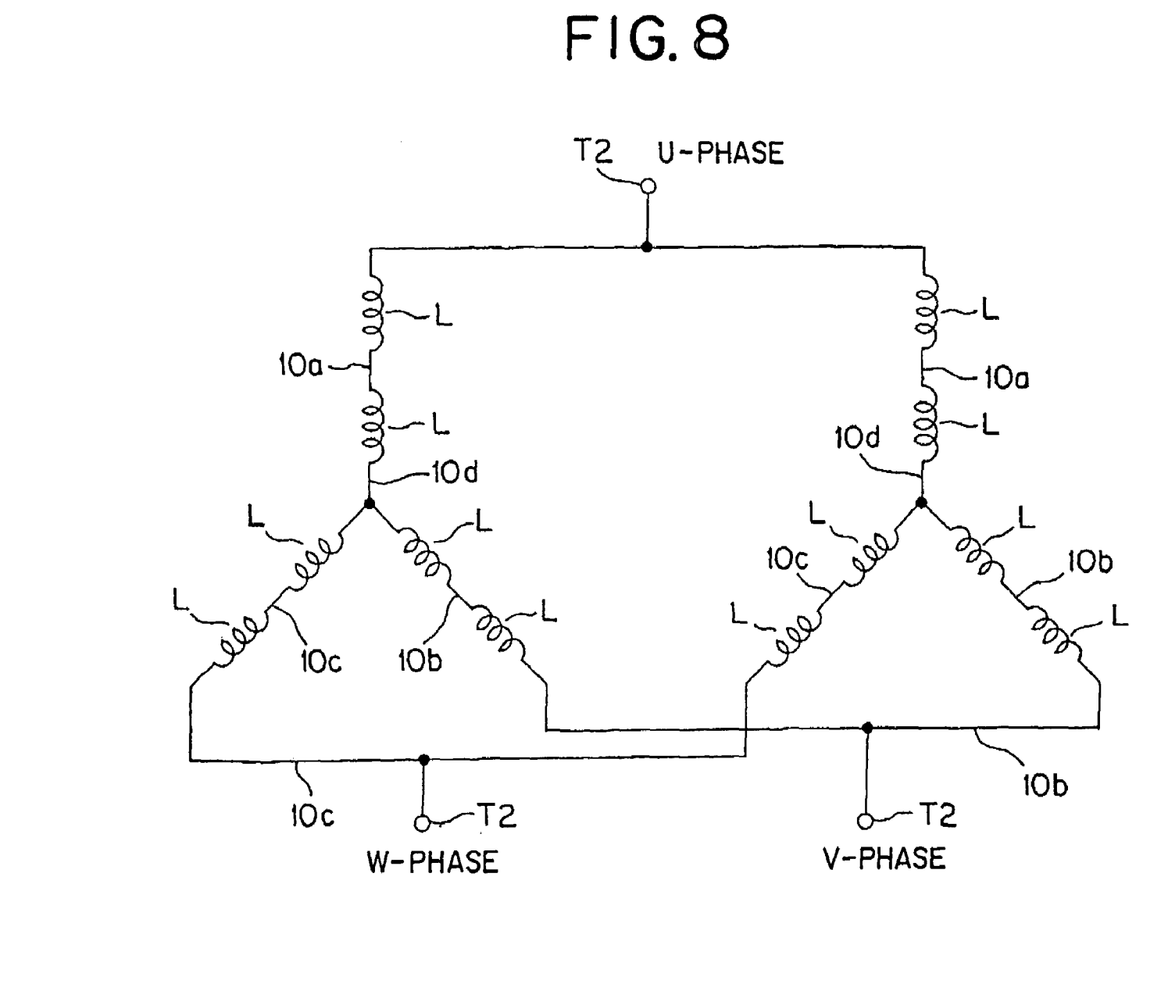
FIG. 8 is a connecting diagram of a stator coil L composing a brushless motor powered by the electric power distribution device of FIG. 1.

As shown in FIG. 8, the band-shaped bus bars 10a, 10b, 10c respectively connect the stator coils L to the U-phase, V-phase, W-phase. There are three of each of the band-shaped bus bars 10a, 10b, 10c. A pair of coil terminal T1 is mounted at both ends of the each three bars in a length direction Y2. A power terminal T2 for connecting to each phase is mounted on one of three bars.

The band-shaped bus bar 10d connects the stator coils of each phase to Y-connection. There are two band-shaped bus bars 10d. Three coil terminals T1 are mounted on both ends and substantially the center of each bus bar 10d in a length direction Y2. The coil terminals T1, T2 are simultaneously formed when stamping the metal plate 92 (FIG. 7) to form the band-shaped bus bars 10a to 10d.

Figure 4A:
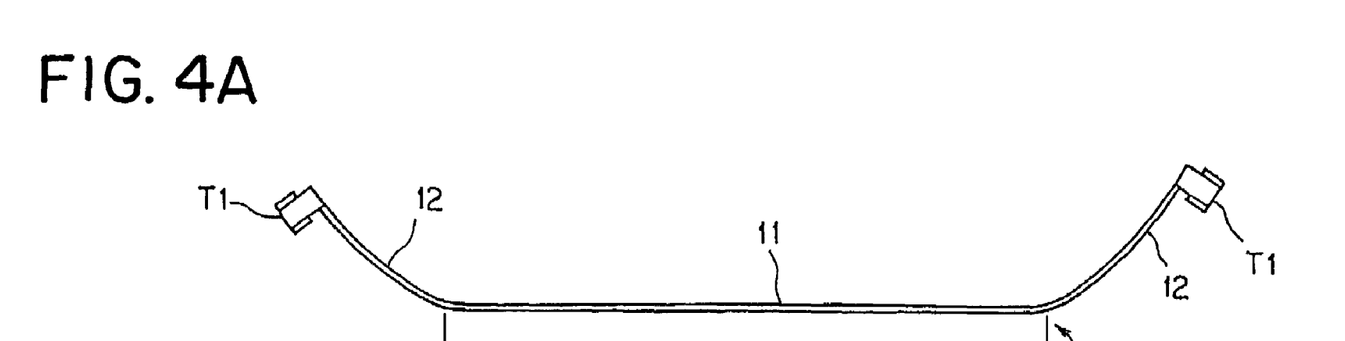
FIG. 4A is a front view showing band-shaped bus bars 10a to 10c composing the electric power distribution device of FIG. 3.
Figure 4B:
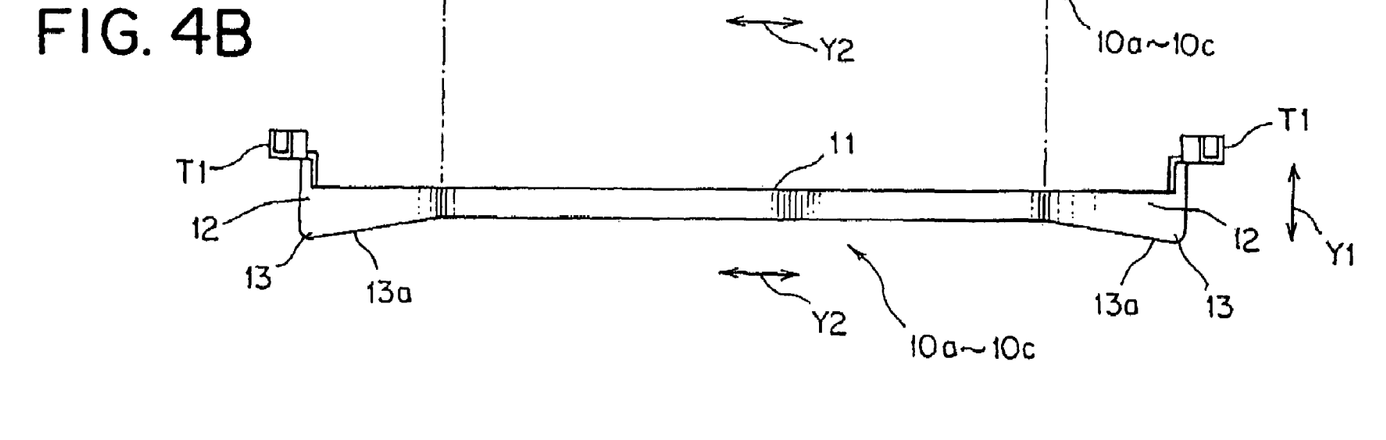
FIG. 4B is a side view showing band-shaped bus bars 10a to 10c composing the electric power distribution device of FIG. 3.

As shown in FIG. 4, each of the band-shaped bus bars 10a to 10c consists of a flat plate mounted on substantially the center of the bar, and curved parts 12 mounted on both ends of the bar. The curved part 12 is curved along the circle about the motor rotation shaft. In each of the band-shaped bus bars 10a to 10c, a pair of projections 13 is projected from both ends in a width direction Y1. A slope 13a is provided on the projection 13. The height of the slope 13 is reduced while leaving from the end. FIG. 4 shows the band-shaped bus bars 10a to 10c on which a pair of coil terminals T1 is solely formed.

However, there are the band-shaped bus bars 10a to 10c having the power terminal T2 with the coil terminals T1, and the band-shaped bus bar 10d having three coil terminals T1. Each of them also has a flat part 11, curved parts 12, and a pair of projections 13.

The band-shaped bus bars 10a to 10d are respectively fitted into the receiving grooves 21a to 21d (FIG. 5) in the insulating holder 20. The insulating holder 20 is made of synthetic resin and formed in a ring shape in a plan view. As material for the insulating holder 20, SPS, PBT, PPS and the like can be used. In this embodiment, SPS with about 30% glass fiber is used for the insulating holder 20. The reason why this SPS is used is, this SPS has a good electrical characteristic (insulation tolerance), and has a good mechanical strength. Forming the receiving grooves 21a to 21d with this material insulates the bus bars 10a to 10d.

Figure 5:
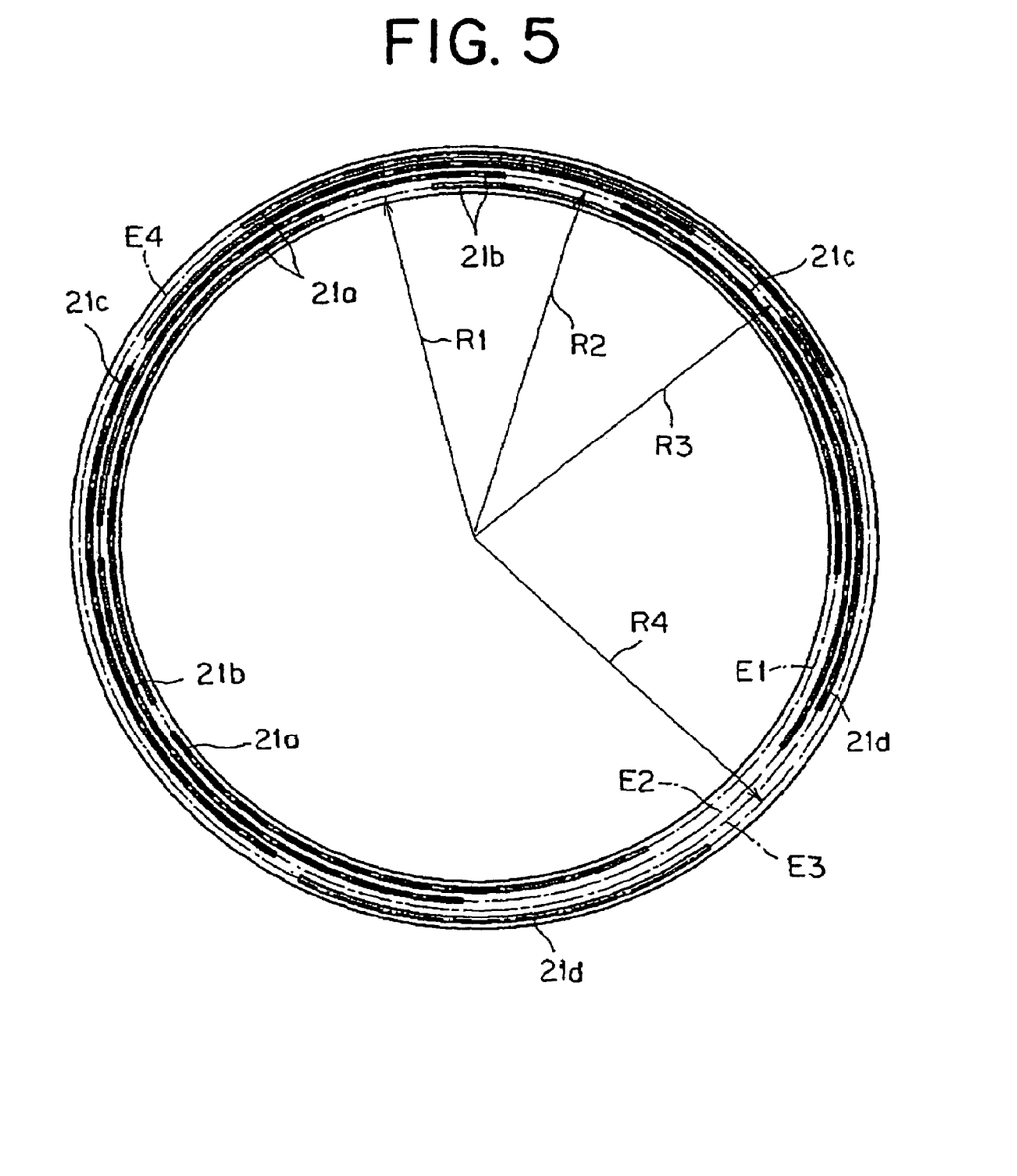
FIG. 5 is a front view showing an insulating holder 20 composing the electric power distribution device of FIG. 1.

As shown in FIG. 5, the insulating holder 20 includes receiving grooves 21a to 21d arranged on concentric circles E1 to E4 having radiuses R1 to R4. Two receiving grooves 21a and one receiving groove 21b are mounted on the circle E1. Two receiving grooves 21b and one receiving groove 21c are mounted on the circle E2. Two receiving grooves 21c and one receiving groove 21d are mounted on the circle E3. One receiving groove 21a and one receiving groove 21d are mounted on the circle E4. The radiuses of the curved parts 12 of the band-shaped bus bars 10a to 10d are equal to the radiuses R1 to R4 of the receiving grooves 21a to 21d into which the bus bars 10a to 10d are respectively received.

Figure 9A:
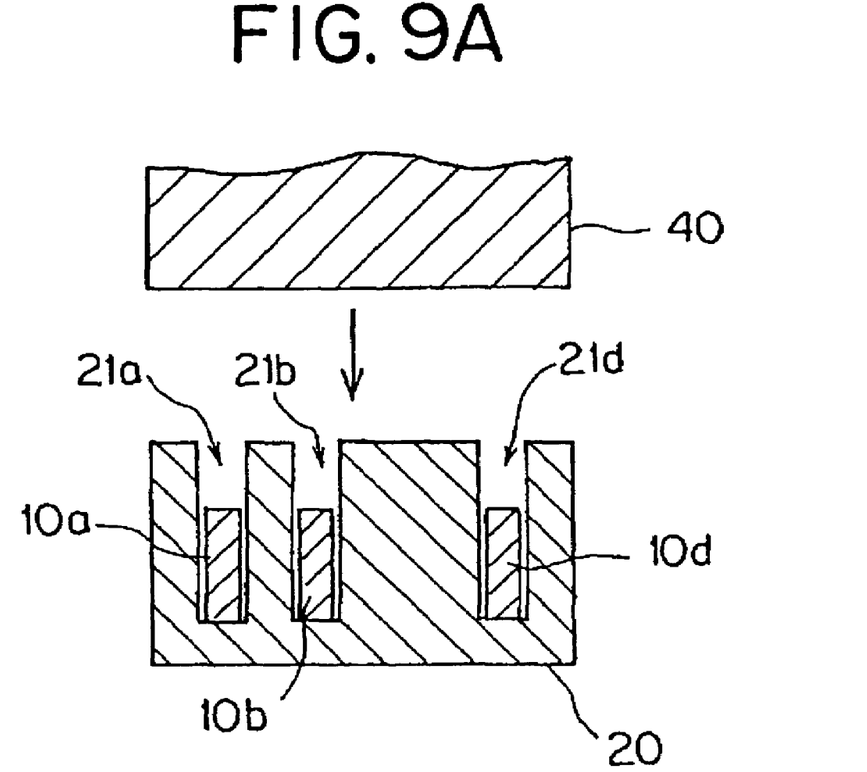
FIG. 9A is a sectional view taken on line I-I in FIG. 1.

As shown in FIGS. 1 and 9A, a bus bar dropout prevention part 22 closing parts of openings of the receiving groove 21a to 21d is formed. This bus bar dropout prevention part 22 is formed by partially melting the insulating holder 20 after the band-shaped bus bars 10a to 10d are fitted into the receiving grooves 21a to 21d.

As shown in FIG. 1, each coil terminal T1 of the band-shaped bus bars 10a to 10d, which are fitted into the receiving grooves 21a to 21d along the circles E1 and E2, includes folded tip parts 14 both of which are folded in a L-shaped section and extended outward from the circles E1 and E2. The stator coil L is connected to the folded tip part 14. Each coil terminal T1 of the band-shaped bus bars 10a to 10d, which are fitted into the receiving grooves 21a to 21d along the circles E3 and E4, is folded in a U-shaped section and extended outward from the circles E3 and E4. In detail, This coil terminal T1 includes a folded part 15 folded toward a center of the circles E3 and E4, and a folded tip part 16 folded toward an outside of the circles E3 and E4. The stator coil L is connected to the folded tip part 16.

A length of the folded part 15 of the coil terminal T1 of the bus bar 10a to 10d fitted into the receiving grooves 21a to 21d extended along the circle E4 is longer than that extended along the circle E3. Thus, the tip ends of the coil terminals T1 are arranged on the same circle.

Figure 3:
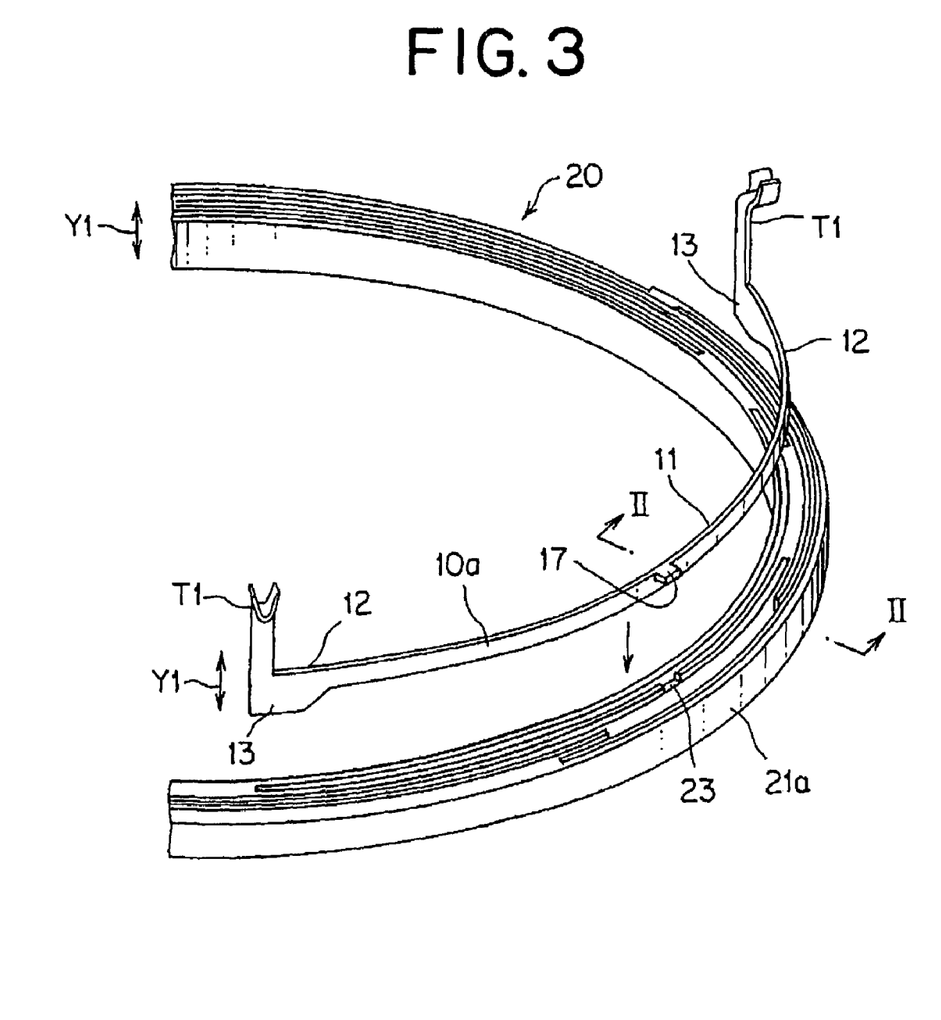
FIG. 3 is a partially exploded perspective view showing the electric power distribution device of FIG. 1.
Figure 6A:
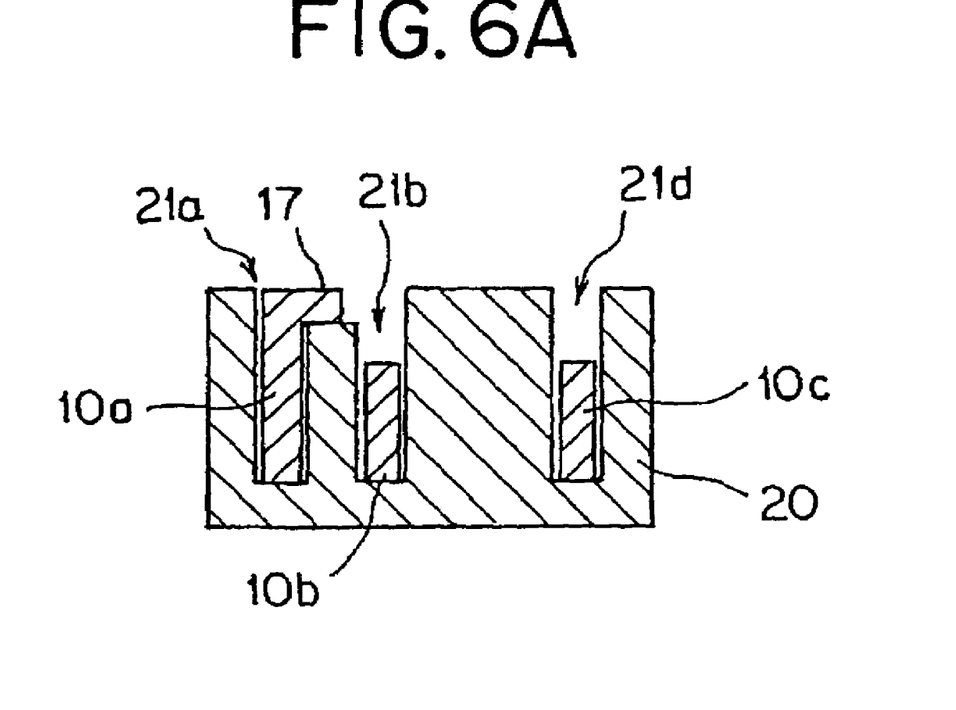
FIG. 6A is a sectional view showing a mis-fitting preventing projection 17 of the electric power distribution device.
Figure 6B:
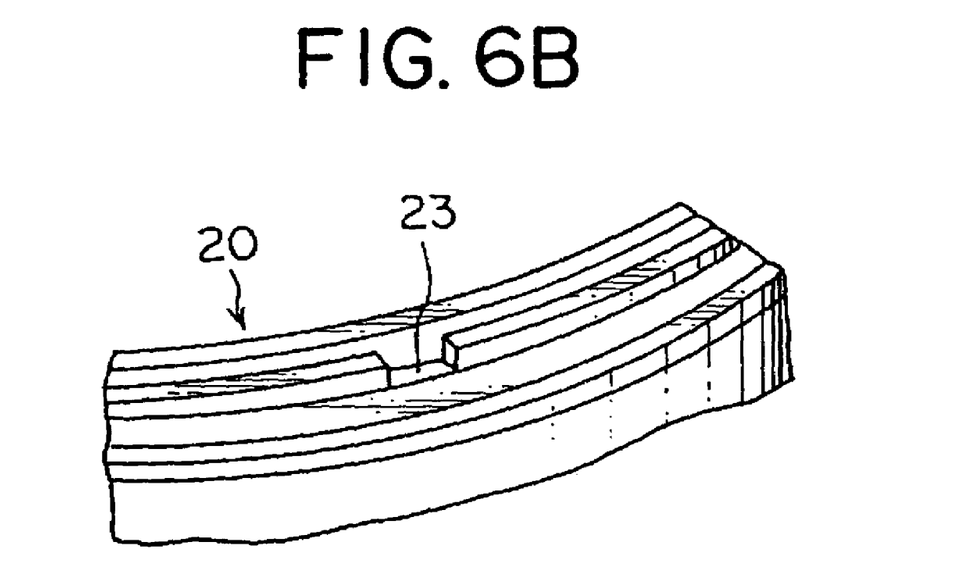
FIG. 6B is a perspective view showing a groove 23 for preventing mis-fitting of the insulating holder 20.

As shown in FIG. 3, a mis-fitting preventing projection 17 is formed on an end in the width direction Y1 of the band-shaped bus bars 10a to 10d. As shown in FIG. 6B, a mis-fitting prevention groove 23 is formed for receiving the mis-fitting preventing projection 17 when the band-shaped bus bars 10a to 10d are correctly fitted into the receiving grooves 21a to 21d.

The mis-fitting preventing projections 17 mounted on the bus bars 10a to 10d are respectively mounted on the different position in the length direction Y2. When the bus bars 10a to 10d are received in the wrong receiving grooves 21a to 21d, the mis-fitting preventing projection 17 is not fitted into the mis-fitting prevention groove 23. Thus, defective goods can be prevented from flowing out by the mis-attaching. Incidentally, reference numeral 30 is a connector housing receiving the power terminal T2.

Figure 7:
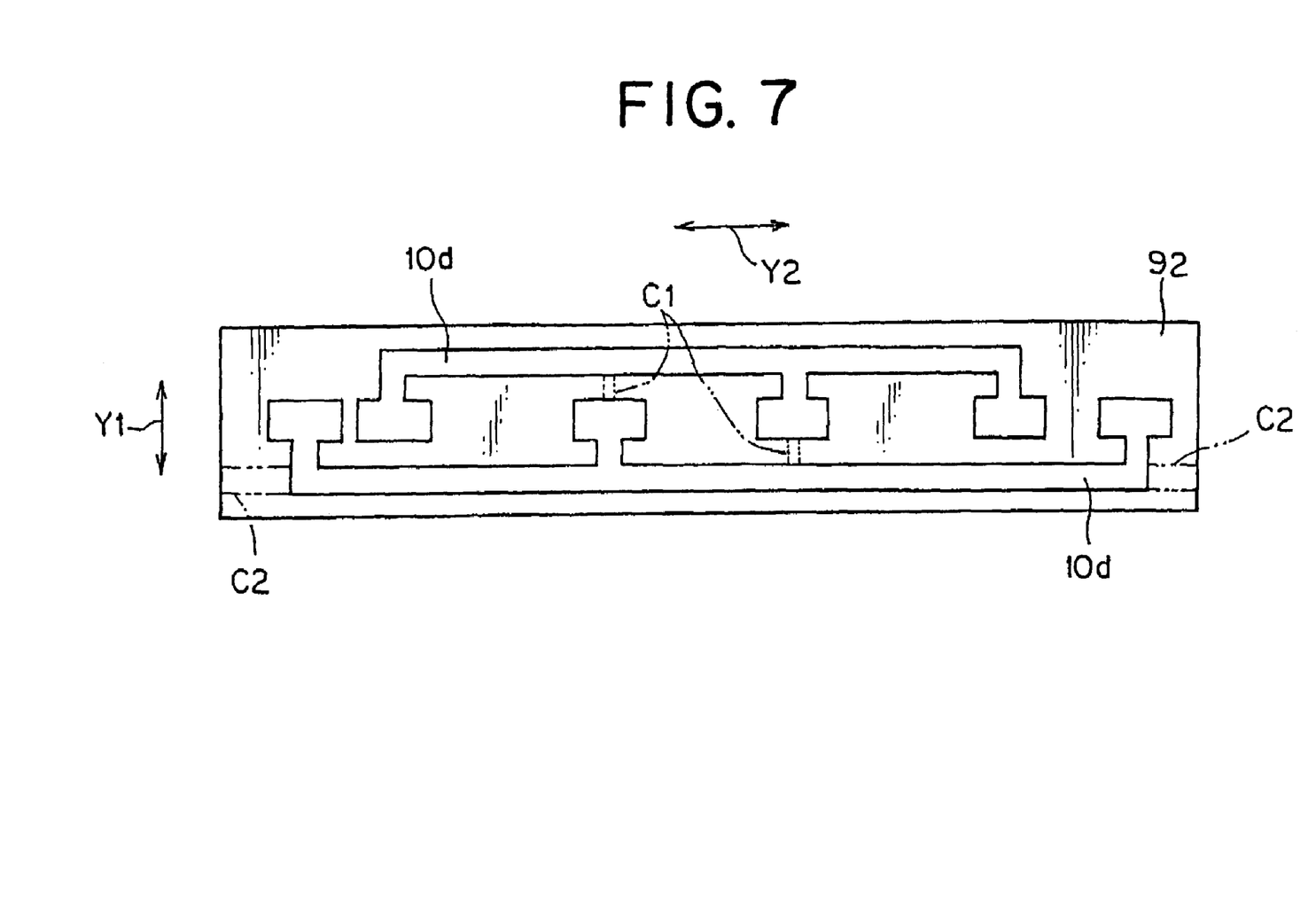
FIG. 7 is a front view showing a metal plate 92 having band-shaped bus bars 10a to 10d to be stamped.

Next, a process of manufacturing the band-shaped bus bars 10a to 10d will be explained. As shown in FIG. 7, two band-shaped bus bars 10d are formed from a rectangular metal plate 92. Two bus bars 10d to be stamped are arranged parallel to each other in a width direction Y1 of the metal plate 92. A carrier C1 is a joint for connecting the bus bars 10d arranged in the width direction Y1, and formed on a flat part 11 which is not curved. A carrier C2 is a joint for connecting the bus bars 10d arranged in the length direction Y2, and formed on both ends of the bus bars 10d in a length direction Y2.

Two bus bars 10d arranged in the width direction Y1 are arranged in a manner that coil terminals T1 face each other. The bus bars 10d are cut out in a manner that the tip ends of the coil terminals T1 are arranged in a line along the length direction Y2. Thus, in the metal plate 92, the bus bars 10d are arranged closely. Resultingly, a dead space between the bus bars 10d is reduced. The uselessness of the material decreases. A width of the metal plate 92 for making the bus bars 10d can be reduced.

In FIG. 7, only the bus bars 10d are shown. Similarly, the bus bars 10a to 10c may be arranged in the width direction Y1 of the metal plate 92. The carriers C1 for connecting the bus bars 10a to 10c arranged in the width direction Y1 may be mounted in a flat part 11. Then, in a scudding process, while the carriers C1 and C2 connect the bus bars, a not-shown press device curves the curved parts 12, folds the coil terminals T1 and the power terminals T2.

As described the above, because a flat part 11 is mounted on at least a part of the bus bars 10a to 10d, numbers of the parts to be curved decreases. Namely, the length of the curved part 12 in the length direction Y2 is reduced. Therefore, numbers of pressing processes to press the curved part 12 in the length direction Y2 is reduced, and a processing cost of the band-shaped bus bars 10a to 10d is reduced. Further, the carriers C1 can be formed on the flat parts 11, so that the band-shaped bus bars 10a to 10d can be formed in a scudding process in which the length direction Y2 is a scudding direction. Resultingly, the processing man-hour is reduced, and the cost of the bus bars 10a to 10d is reduced.

Next, how to receive the band-shaped bus bars 10a to 10d in the insulating holder 20 will be explained. First, while one of a pair of projections 13 formed on the curved part of the bus bar 10a is inserted into the receiving grooves 21a to 21d, the other part of the projections 13 is inserted into the receiving grooves 21a to 21d. Then, the flat part 11 is gradually curved so that the bus bars 10a to 10d are fitted into the receiving grooves 21a to 21d.

Thus, firstly the projections 13 are inserted into the receiving grooves 21a to 21d, and then the whole bus bars 10a to 10d are received in the receiving grooves 21a to 21d. Therefore, a work for fitting the bus bars 10a to 10d into the receiving grooves 21a to 21d becomes easy. Further, the bus bars 10a to 10d at least partially have curved parts 12, so that a work for fitting the bus bars 10a to 10d into the receiving grooves 21a to 21d becomes easy. Thus, the cost can be further reduced.

According to the electric power distribution device described above, the bus bars 10a to 10d having the flat parts 11 are received in the receiving grooves 21a to 21d extended along the circles E1 to E4. Namely, the flat parts 11 of the bus bars 10a to 10d are curved along the circles E1 to E4 and received. Therefore, resilient force of the bus bars 10a to 10d and curving force of the insulating holder 20 are applied to the flat parts 11. Therefore, the bus bars 10a to 10d received in the receiving groove 21a to 21d do not easily drop out.

Figure 9B:
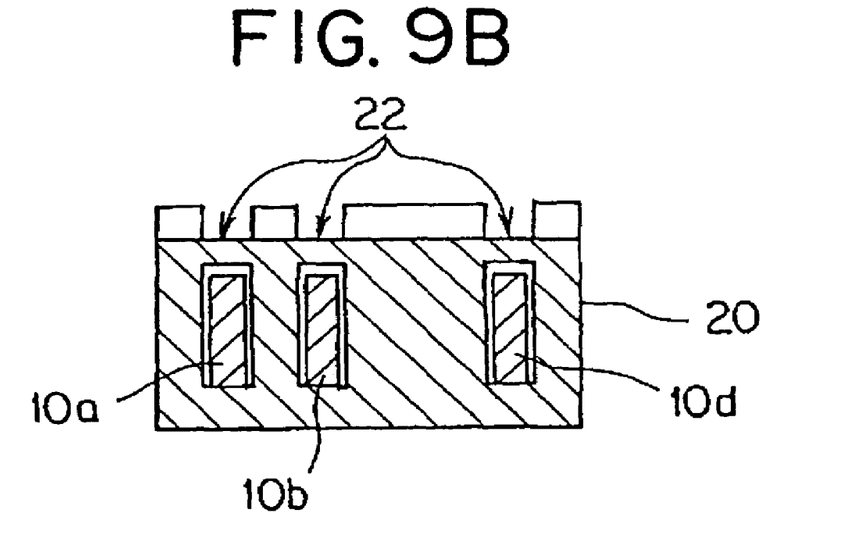
FIG. 9B is a sectional view showing a formation procedure of a bus bar dropout prevention part 22 shown in FIG. 9A.

After the bus bars 10a to 10d are fitted into the receiving grooves 21a to 21d of the insulating holder 20, for preventing the bus bars 10a to 10d from dropping out from the insulating holder 20, as shown in FIG. 9A, for example, a heated iron plate 40 is pressed against the insulating holder 20. When pressing the iron plate 40, the insulating holder 20 melts and flows into the openings of the receiving grooves 21a to 21d to close the openings of the receiving grooves 21a to 21d. Thus, other members for closing the openings of the receiving grooves 21a to 21d are not necessary. The production cost is further reduced.

Incidentally, in this embodiment, the receiving grooves are extended along the circles E1 to E4. However, the present invention is not limited to this. As long as the coil terminals T1 are arranged on a circle, the receiving grooves 21a to 21d may be formed in the same shape as the bus bars 10a to 10d, and the flat parts may not be curved.

Further, in this embodiment, the curved parts 12 are formed on both ends of the bus bars 10a to 10d in the length direction Y2. However, the curved parts 12 may not be a pair, and positions on which the curved parts 12 are formed may not be both ends. For example, the curved parts 12 may be formed at the center of the bus bars 10a to 10d, and the both ends in the length direction Y2 may be flat parts 11. In this case, the curved parts 12 are firstly received in the receiving grooves 21a to 21d, and then the flat parts 11 at the both ends are curved and inserted easily. In this case, a projection 13 is mounted on the center-curved part 12 so that the bus bars 10a to 10d further easily are received in the receiving grooves 21a to 21d.

Further, in this embodiment, the mis-fitting preventing projections 17 are formed on the bus bars 10a to 10d, and the mis-fitting prevention grooves 23 are formed on the insulating holder 20. However, the present invention is not limited to this. For example, the mis-fitting preventing projections 17 may be mounted on bottom walls of the receiving grooves 21a to 21d, and the mis-fitting prevention grooves 23 may be mounted on the other ends of the bus bars 10a to 10d in the width direction Y1.

Further, in this embodiment, arc-shaped receiving grooves 21a to 21d extended along the circles E1 to E4 are mounted. However, the present invention is not limited to this. The receiving grooves may be extended along the whole circles E1 to E4.

Second Embodiment

Next, a second embodiment according to the present invention will be explained.

Figure 10:
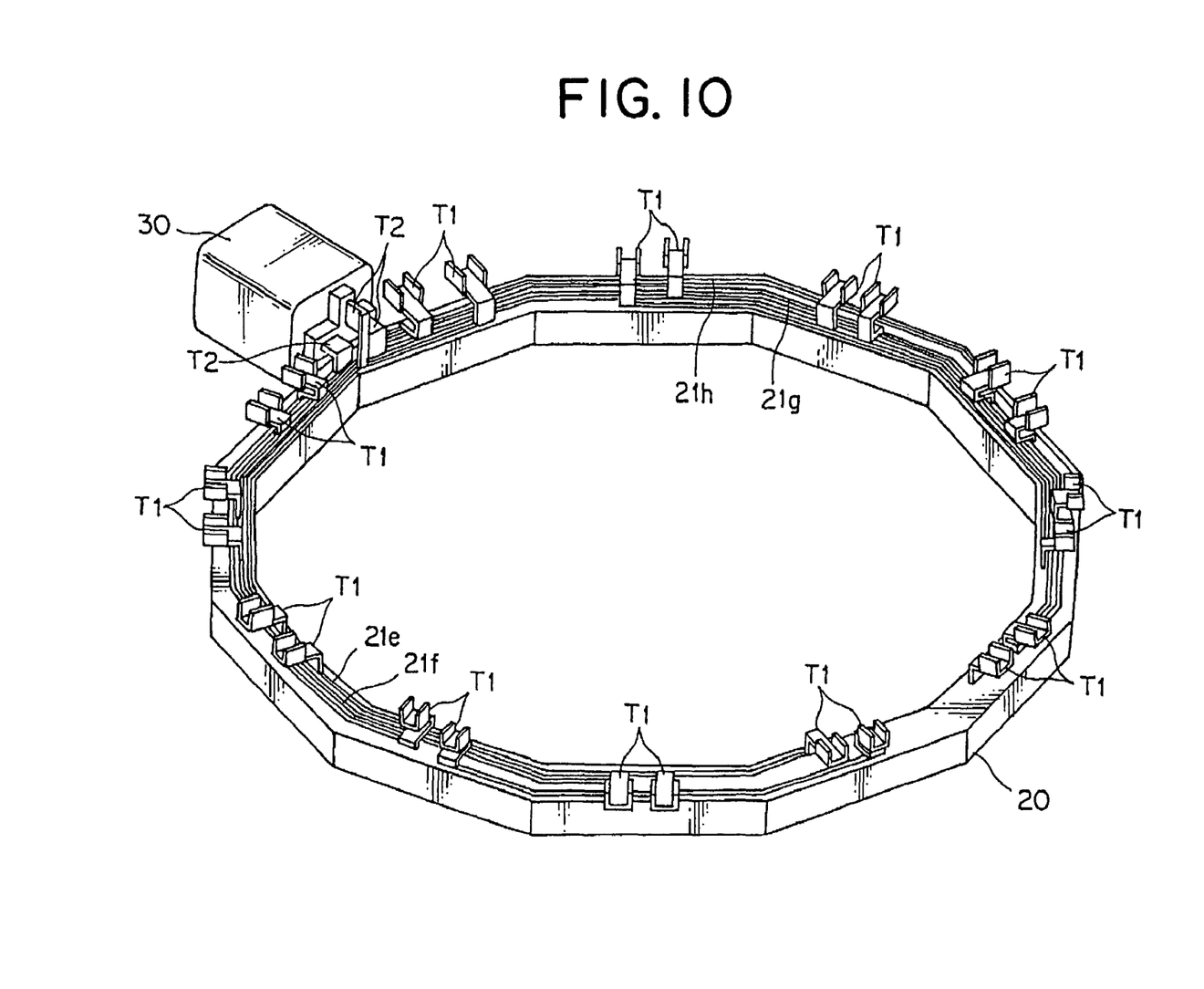
FIG. 10 is a perspective view showing a second embodiment of the electric power distribution device according to the present invention.
Figure 11:
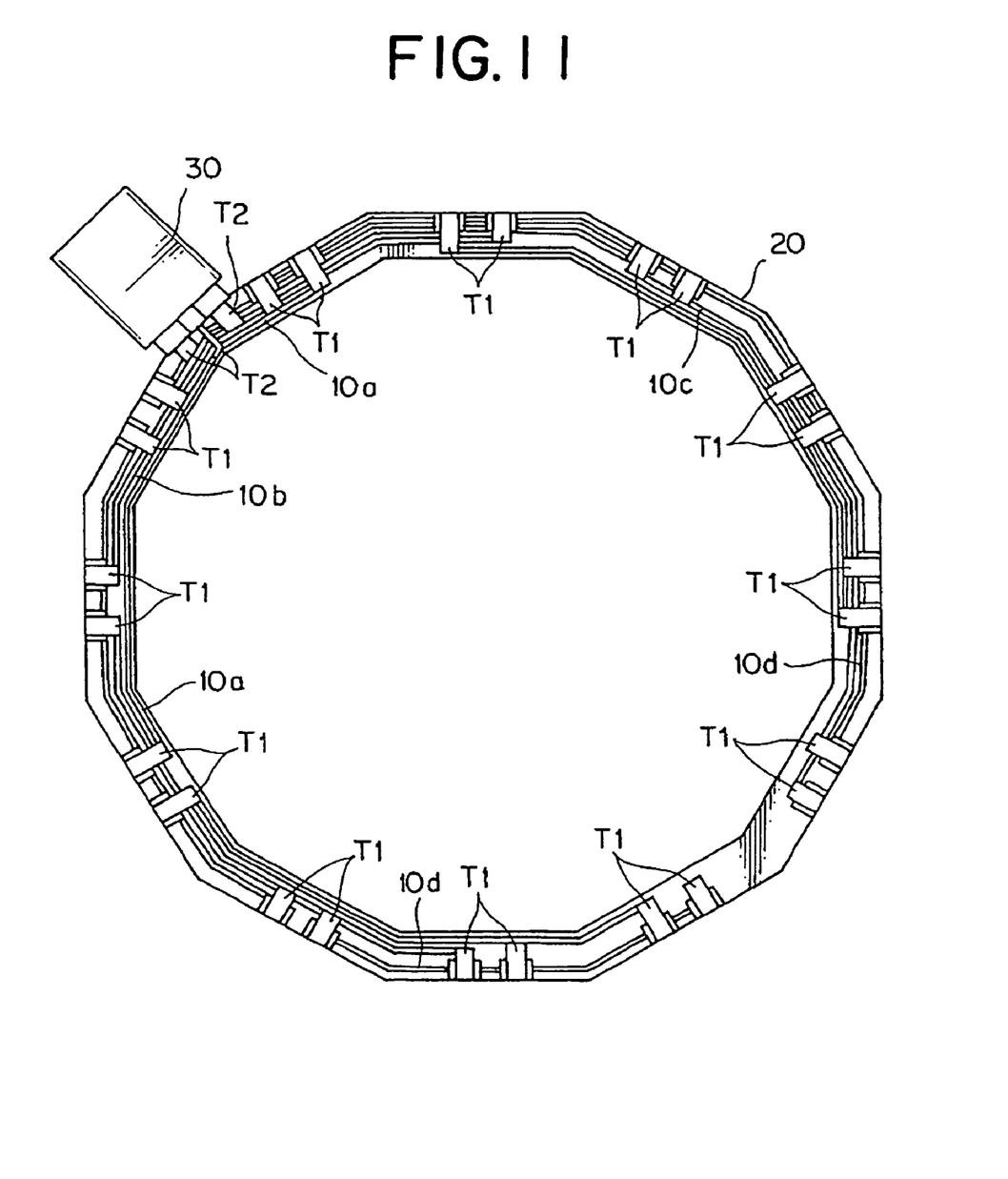
FIG. 11 is a front view showing the electric power distribution device of FIG. 1.
Figure 12:
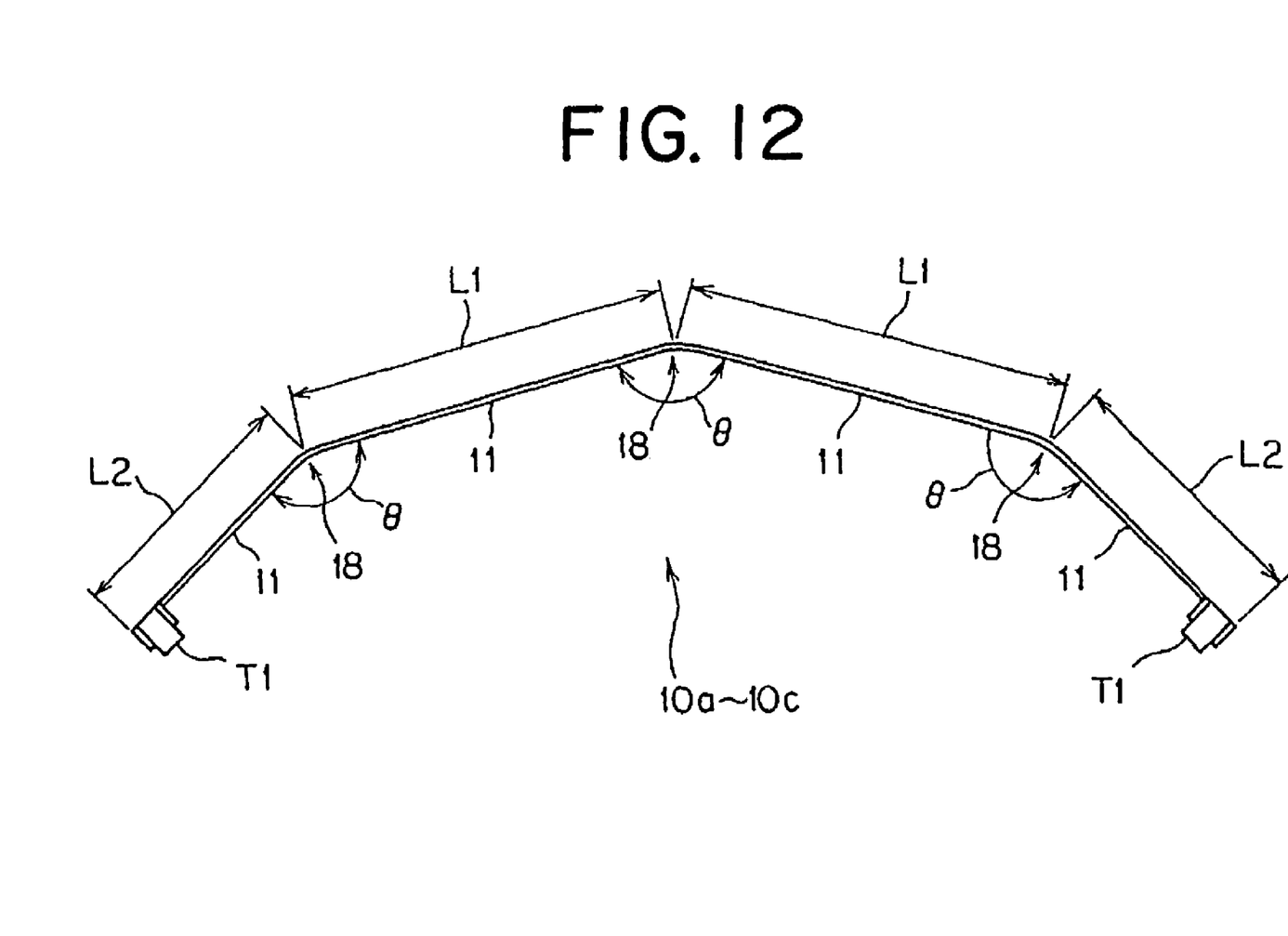
FIG. 12 is a view showing the band-shaped bus bars 10a to 10d composing the electric power distribution device shown in FIGS. 10 and 11.

As shown in FIGS. 10 to 12, the electric power distribution device includes band-shaped bus bars 10a to 10d each in which the coil terminal T1 is formed on an end in the width direction Y1, and a insulating holder 20 on which receiving grooves 21e to 21f are formed. The coil terminal T1 supplies power to the stator coil L. The receiving grooves 21e to 21f receive the bus bars 10a to 10d in a manner that they are insulated from each other.

The coil terminal T1 and the power terminal T2 in the second embodiment respectively work the same as those in the first embodiment. As shown in FIG. 12, a plurality of flat parts 11 are formed on the band-shaped bus bars 10a to 10d, and a folded part 18 is interposed between the flat parts 11 adjacent to each other. In the band-shaped bus bars 10a to 10d, lengths L1 at the flat parts 11 except at both ends are equal to each other. Folding angles θ of the folded parts 18 are equal with the interior angle of regular dodecagon.

Further, in the band-shaped bus bars 10a to 10d, lengths L2 at both edges are shorter than the lengths L1 at the flat parts 11. In this embodiment, L2 is shorter than the L1. Each of band-shaped bus bars 10a to 10d is arranged along regular dodecagon. The band-shaped bus bars 10a to 10d are fitted into receiving grooves 21e to 21h in the insulating holder 20. The insulating holder 20 is made of synthetic resin, and an outer shape of the insulating holder 20 is regular dodecagon.

As shown in FIGS. 10 and 11, the receiving grooves 21e to 21j are extended along regular dodecagon on the insulating holder 20. Lengths of the receiving grooves 21e to 21j are different. As shown in FIG. 10, the receiving groove 21e includes two band-shaped bus bars 10a and one band-shaped bus bar 10b. The receiving groove 21f includes two band-shaped bus bars 10b and one band-shaped bus bars 10c. The receiving groove 21g includes two band-shaped bus bars 10c and one band-shaped bus bar 10d. The receiving groove 21h includes one band-shaped bus bar 10a and one band-shaped bus bar 10d. The length L1 is equal to the length of each side of the receiving grooves 21e to 21h.

Next, a production method of the band-shaped bus bars 10a to 10d will be explained. Similar to the first embodiment shown in FIG. 8, the bus bars 10d are arranged parallel to each other in the width direction Y1 of the metal plate 92. The bus bars 10d are stamped in a manner connected to each other with the carrier C1. The carrier C1 is disposed on the flat part 11. Then, in a scudding process, while the carriers C1 and C2 connect the bus bars, a not-shown press device presses along regular dodecagon, folds the coil terminals T1 and the power terminals T2.

According to the above, because using the band-shaped bus bars 10a to 10d having the flat parts 11 and the folded parts 18, no curving process is needed and the production cost of the band-shaped bus bars 10a to 10d is reduced. Further, the carrier C1 connecting the band-shaped bus bars 10a to 10d can be formed on the flat part 11, so that the band-shaped bus bars 10a to 10d are formed in the scudding process. Accordingly, the processing man-hour is reduced, and the production cost of the band-shaped bus bars 10a to 10d can be reduced. Further, even there has no curved part 12, it is easy to fit the band-shaped bus bars 10a to 10d into the receiving grooves 21e to 21h.

Owing to receiving the band-shaped bus bars 10a to 10d in the receiving grooves 21e to 21h along regular dodecagon, the length L1 of the flat part 11 is equal to the side of regular dodecagon, and the folding angle θ of the folded part 18 is equal to the inner angle of regular dodecagon. Thus, size accuracy can be improved. Namely, in general, the size accuracy using regular dodecagon is better than that using the circle. Thus, the production cost is further reduced.

Incidentally, in the second embodiment, the outer shape of the insulating holder 20 is regular dodecagon. However, the present invention is not limited to this. Regular polygons not less than triangle may be used. Further, like the first embodiment, the projection 13, the mis-fitting preventing projection 17, the mis-fitting prevention groove 23, the bus bar dropout prevention part 22 can be used. Further, like the first embodiment, the band-shaped bus bars 10a to 10d may be fitted into the receiving grooves to 21h extended along the circles E1 to E4.

Further, in this embodiment, the receiving grooves 21e to 21d are extended along the outer shape of regular dodecagon. However, this invention is not limited to this. For example, the band-shaped bus bars 10a to 10d having the flat parts 11 and the folded parts 18 as shown in FIG. 12 may be fitted into the receiving grooves 21a to 21d extending along the circles E1 to E4. Even in this case, because the folded parts 18 are arranged substantially along the circles E1 to E4, the band-shaped bus bars 10a to 10d are more easily fitted into the receiving grooves 21a to 21d than the band-shaped bus bars only consisting of the flat parts 11.

Inversely, the band-shaped bus bars 10a to 10d having the flat parts 11 and the curved parts 12 shown in FIG. 4 may be fitted into the receiving grooves 21e to 21h along regular dodecagon shown in FIG. 11. Even in this case, because the curved part 12 is curved along the outer shape of regular dodecagon, the band-shaped bus bars 10a to 10d are more easily fitted into the receiving grooves 21e to 21h than the band-shaped bus bars only consisting of the flat parts 11.

Further, in this embodiment, the receiving grooves 21e to 21h are disposed along regular dodecagon. However, this invention is not limited to this. Like the first embodiment, receiving grooves 21e to 21h are formed at only the positions where the band-shaped bus bars 10a to 10d are fitted. It is not necessary to form the receiving grooves over all surroundings of regular dodecagon.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An electric power distribution device comprising:
    a band-shaped bus bar having a length direction and a width direction;
    coil terminals disposed at an end at the width direction of the bus bar for supplying power to stator coils arranged on a circle a center of which is a motor rotation shaft; and
    a band-shaped bus bar holder on which a receiving groove for receiving the band-shaped bus bar through a receiving groove opening is formed in a manner that the coil terminals are arranged on the circle,
    wherein each band-shaped bus bar has at least one portion thereof which is linear in the length direction and a projection provided at an end of the linear portion in the width direction and sloped toward the center of the bus bar.

2. The electric power distribution device as claimed in claim 1,
    wherein the band-shaped bus bar has at least one portion thereof which is curved in the length direction and curving along the circle a center of which is the motor rotation shaft.

3. The electric power distribution device as claimed in claim 1,
    wherein a plurality of portions of the bus bar which are linear in the length direction are formed on the band-shaped bus bar, and a folded part is formed between the portions of the bus bar which are linear in the length direction adjacent to each other.

4. The electric power distribution device as claimed in claim 1,
    wherein the band-shaped bus bar includes a projection projecting from the other end at the width direction of the bus bar.

5. The electric power distribution device as claimed in claim 1,
    wherein the receiving groove is extended along the circle the center of which is the motor rotation shaft in a view from an opening side of the receiving groove.

6. The electric power distribution device as claimed in claim 1,
    wherein the receiving groove is extended along a polygon in a view from the opening side of the receiving groove.

7. The electric power distribution device as claimed in claim 1,
    wherein the bus bar holder formed by melting a part thereof includes a bus bar dropout prevention part for closing a part of the receiving groove opening.

* * * * *